(12) United States Patent
Kishimoto et al.

(10) Patent No.: US 11,383,813 B2
(45) Date of Patent: Jul. 12, 2022

(54) AUTOMATIC STEERING DEVICE, AUTOMATIC STEERING METHOD AND AUTOMATIC STEERING PROGRAM

(71) Applicant: FURUNO ELECTRIC CO., LTD., Nishinomiya (JP)

(72) Inventors: Kazuya Kishimoto, Nishinomiya (JP); Kazutoshi Simo, Nishinomiya (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 318 days.

(21) Appl. No.: 16/406,861

(22) Filed: May 8, 2019

(65) Prior Publication Data
US 2019/0344875 A1    Nov. 14, 2019

(30) Foreign Application Priority Data

May 10, 2018  (JP) .............................. JP2018-091341

(51) Int. Cl.
| | |
|---|---|
| *B63H 25/00* | (2006.01) |
| *B63H 25/04* | (2006.01) |
| *B63H 25/36* | (2006.01) |
| *G01C 21/34* | (2006.01) |
| *G05D 1/02* | (2020.01) |

(52) U.S. Cl.
CPC .............. *B63H 25/04* (2013.01); *B63H 25/36* (2013.01); *G01C 21/3407* (2013.01); *G05D 1/0206* (2013.01); *B63H 2025/045* (2013.01)

(58) Field of Classification Search
CPC .. B63H 25/04; B63H 25/36; B63H 2025/045; G01C 21/3407; G05D 1/0206
USPC ......................................................... 701/41
See application file for complete search history.

(56) References Cited

U.S. PATENT DOCUMENTS

| | | | | |
|---|---|---|---|---|
| 2007/0162207 A1* | 7/2007 | Shimo | .................... | B63H 25/04 701/42 |
| 2012/0130570 A1* | 5/2012 | Pease | .................... | B63H 25/04 701/21 |

FOREIGN PATENT DOCUMENTS

| | | |
|---|---|---|
| EP | 3 214 522 A1 | 9/2017 |
| JP | H07-242199 A | 9/1995 |
| JP | H09-207889 A | 8/1997 |
| JP | 3535887 B2 | 6/2004 |
| JP | 3874827 B2 | 1/2007 |
| JP | 4261330 B2 | 4/2009 |

(Continued)

OTHER PUBLICATIONS

The extended European search report issued by the European Patent Office dated Oct. 4, 2019, which corresponds to European Patent Application No. 19173505.9-1015 and is related to U.S. Appl. No. 16/406,861.

*Primary Examiner* — Tyler J Lee
*Assistant Examiner* — Tiffany P Ohman
(74) *Attorney, Agent, or Firm* — Studebaker & Brackett PC

(57) ABSTRACT

An automatic steering device may include a route calculator, an indirect target point calculating module, a command steering angle calculating module, and a steering controlling module. The route calculator may calculate a route of a ship based on positions of a plurality of target points. The indirect target point calculating module may calculate an indirect target point ahead of the ship. The command steering angle calculating module may calculate a command steering angle based on a positional relation between the route and the indirect target point. The steering controlling module may control a steering mechanism of the ship based on the command steering angle.

17 Claims, 8 Drawing Sheets

(56) References Cited

FOREIGN PATENT DOCUMENTS

| JP | 2009-248897 A | 10/2009 |
| JP | 2014-004911 A | 1/2014 |

\* cited by examiner

AUTOMATIC STEERING DEVICE, AUTOMATIC STEERING METHOD AND AUTOMATIC STEERING PROGRAM

CROSS-REFERENCE TO RELATED APPLICATION(S)

This application claims priority under 35 U.S.C. § 119 to Japanese Patent Application No. 2018-091341, which was filed on May 10, 2018, the entire disclosure of which is hereby incorporated by reference.

TECHNICAL FIELD

The present disclosure relates to an automatic steering device, an automatic steering method, and an automatic steering program.

BACKGROUND

Conventionally, a technology related to automatic steering which causes a ship to travel along a traveling route connecting a plurality of preset target points has been developed, such as an automatic steering method which changes a route (veers) by turning at a constant turn rate from a current route into a new or next route. Such method calculates a veering point on the current route based on a specified turning radius or a turning radius determined from the turn rate and a ship speed. Such method then calculates a veering line passing through the veering point which is parallel to the new route. The veering is started when a ship passes the veering line.

However, after the veering is started, the ship may not be able to travel along the desired route due to external factors, such as waves.

SUMMARY

The present disclosure is made in view of solving the above problem, and one purpose thereof is to provide an automatic steering device, an automatic steering method, and an automatic steering program, capable of causing a ship to more accurately travel along a route to turn a ship.

According to one aspect of the present disclosure, an automatic steering device comprises processing circuitry. The processing circuitry may be configured to calculate a route to turn a ship based on positions of a plurality of waypoints, calculate an intermediate waypoint ahead of the ship, calculate a command steering angle based on a positional relation between the route and the intermediate waypoint, and control a rudder of the ship based on the command steering angle.

The processing circuitry may be configured to calculates the intermediate waypoint based on a response of the ship to the command steering angle, a traveling speed of the ship, and a course setting of the ship and a current course of the ship.

According to this configuration in which the intermediate waypoint which is the passing position of the ship is estimated, and the command steering angle is calculated based on the positional relation between the estimated intermediate waypoint and the route, the command steering angle when the ship arrives at the intermediate waypoint can be calculated prior to arriving of the ship at the intermediate waypoint. For this reason, for example, even if it takes a time for the ship to actually start the turning according to the command steering angle after the start of the control of the steering mechanism according to the command steering angle, the turning can be started at the desired point more certainly. Therefore, the traveling along the route can be performed more accurately.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
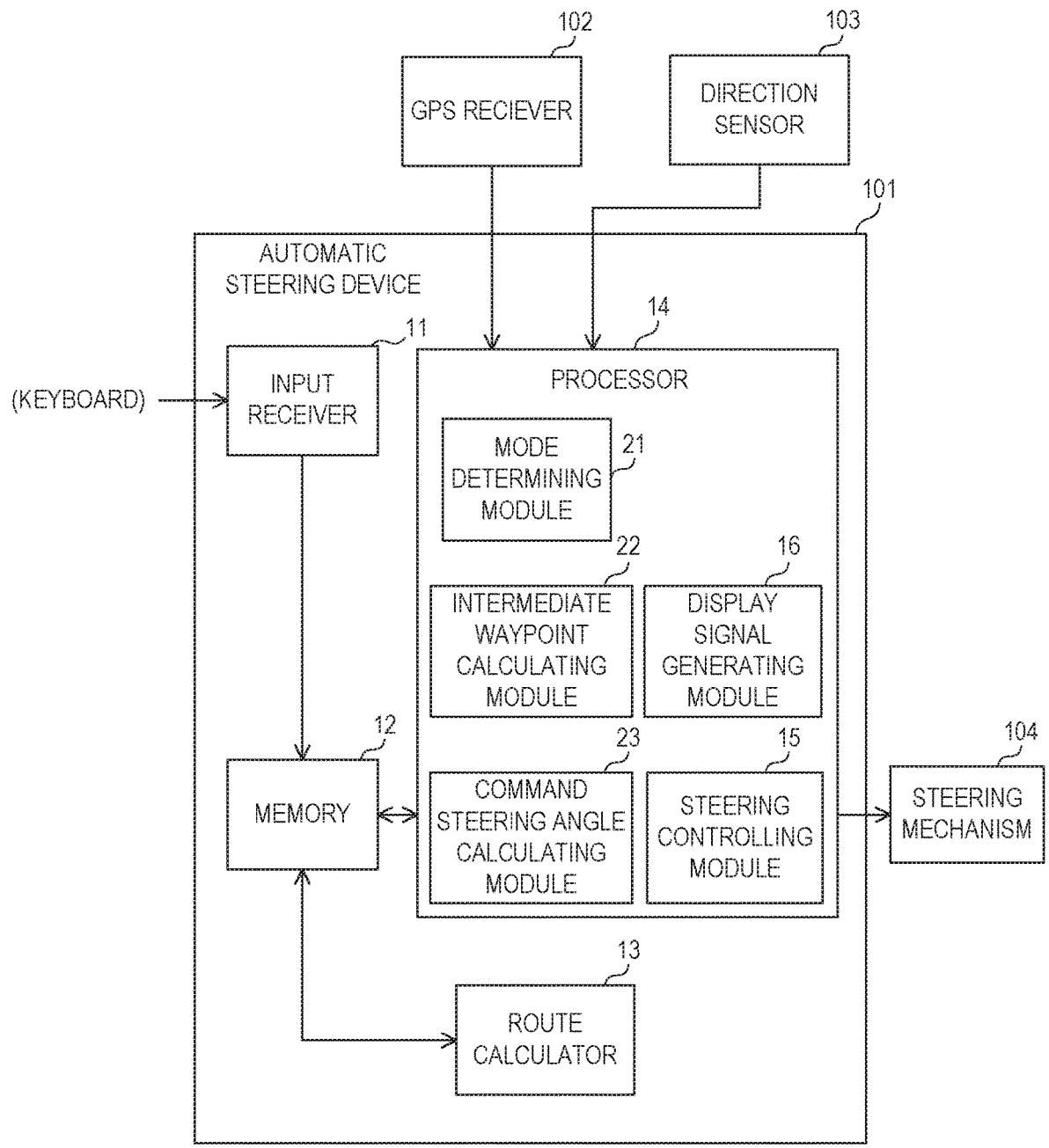
FIG. 1 is a view illustrating a configuration of an automatic steering system according to one embodiment of the present disclosure.

Hereinafter, one embodiment of the present disclosure will be described with reference to the accompanying drawings. Note that the same reference characters are assigned to the same or corresponding parts throughout the figures to omit redundant description. Moreover, at least a part of the embodiment described below may be combined arbitrarily.
<Configuration and Basic Operation>
[Automatic Steering System]

FIG. 1 is a view illustrating a configuration of an automatic steering system according to one embodiment of the present disclosure.

Referring to FIG. 1, an automatic steering system 201 includes, for example, an automatic steering device 101, a GPS receiver 102, a direction sensor 103, and a steering mechanism 104 (rudder).

The GPS receiver 102 may receive positioning signals from a plurality of GPS antennas (not illustrated) fixed to a ship 10 (hereinafter, referred to as "the ship" to be distinguished from other ships), detect a current position of the ship 10, and transmit positional information indicative of the detected position of the ship 10 to the automatic steering device 101. Note that the present disclosure may be applied to ships which typically travels on water or sea and may be referred to as surface ships, and may also be applied to other types of ships, which may include boats, dinghies, watercraft, and vessels. Further, the present disclosure may also be applied, if applicable, to submarines, aircrafts, and spaceships, as well as any types of vehicles which travel on the ground, such as automobiles, motorcycles, and ATVs.

The direction sensor 103 may measure a current course of the ship 10, i.e., a bow direction ψ[n] based on, for example, a relative relation of a plurality of positions of the ship 10 detected by the respective GPS antennas, and transmit bow direction information indicative of the measured bow direction ψ[n] to the automatic steering device 101.

The automatic steering device 101 may include an input receiver 11, a memory 12, a route calculator 13, and a processor 14. The processor 14 may include a mode determining module 21, an intermediate waypoint calculating module 22, a command steering angle calculating module 23, a steering controlling module 15, and a display signal generating module 16.

The input receiver 11 may receive settings of a plurality of target points P. For example, the input receiver 11 stores in the memory 12 target point information indicative of positions of a plurality of target points P inputted by a user through a keyboard etc.

The route calculator 13 may calculate a traveling route R based on the target point information stored in the memory 12. The route calculator 13 may store route information indicative of the calculated traveling route R in the memory 12.

The mode determining module 21 may determine a traveling mode of the ship 10 based on, for example, the positional information of the ship 10 received from the GPS receiver 102.

The intermediate waypoint calculating module 22 may calculate and update an intermediate waypoint S ahead of the ship 10, for example, periodically or irregularly, when the traveling mode determined by the mode determining module 21 is a turning tracking mode described later.

The command steering angle calculating module 23 may newly calculate and update a course setting ψ0[n] for causing the ship 10 to travel along the traveling route R which is indicated by the route information stored in the memory 12, for example, each time the intermediate waypoint S is updated.

The command steering angle calculating module 23 may calculate a command steering angle based on the latest course setting ψ0[n] each time the course setting ψ0[n] is updated, and output command steering angle information indicative of the calculated command steering angle to the steering controlling module 15.

In response to the command steering angle information outputted from the command steering angle calculating module 23, the steering controlling module 15 may control a steering angle etc. of the steering mechanism 104 based on the command steering angle indicated by the command steering angle information.

The display signal generating module 16 may generate a display signal for displaying on an external apparatus (not illustrated) the traveling route R calculated by the route calculator 13 and the intermediate waypoint S calculated by the intermediate waypoint calculating module 22.

In more detail, the display signal generating module 16 may generate the display signal including the route information stored in the memory 12 and the positional information on the intermediate waypoint S calculated by the intermediate waypoint calculating module 22, and then transmit the generated display signal to an external apparatus. The external apparatus may receive the display signal transmitted from the display signal generating module 16, and then display, for example, a screen including the traveling route R and the intermediate waypoint S on a monitor of the ship based on the route information and the positional information on the intermediate waypoint S included in the received display signal.

Note that the automatic steering system 201 may further include other apparatuses, in addition to the automatic steering device 101, the GPS receiver 102, the direction sensor 103, and the steering mechanism 104. Moreover, the automatic steering system 201 is not limited to such a configuration including all of the automatic steering device 101, the GPS receiver 102, the direction sensor 103, and the steering mechanism 104.

[Route Calculator]

(Calculation of Traveling Route)

Figure 2:
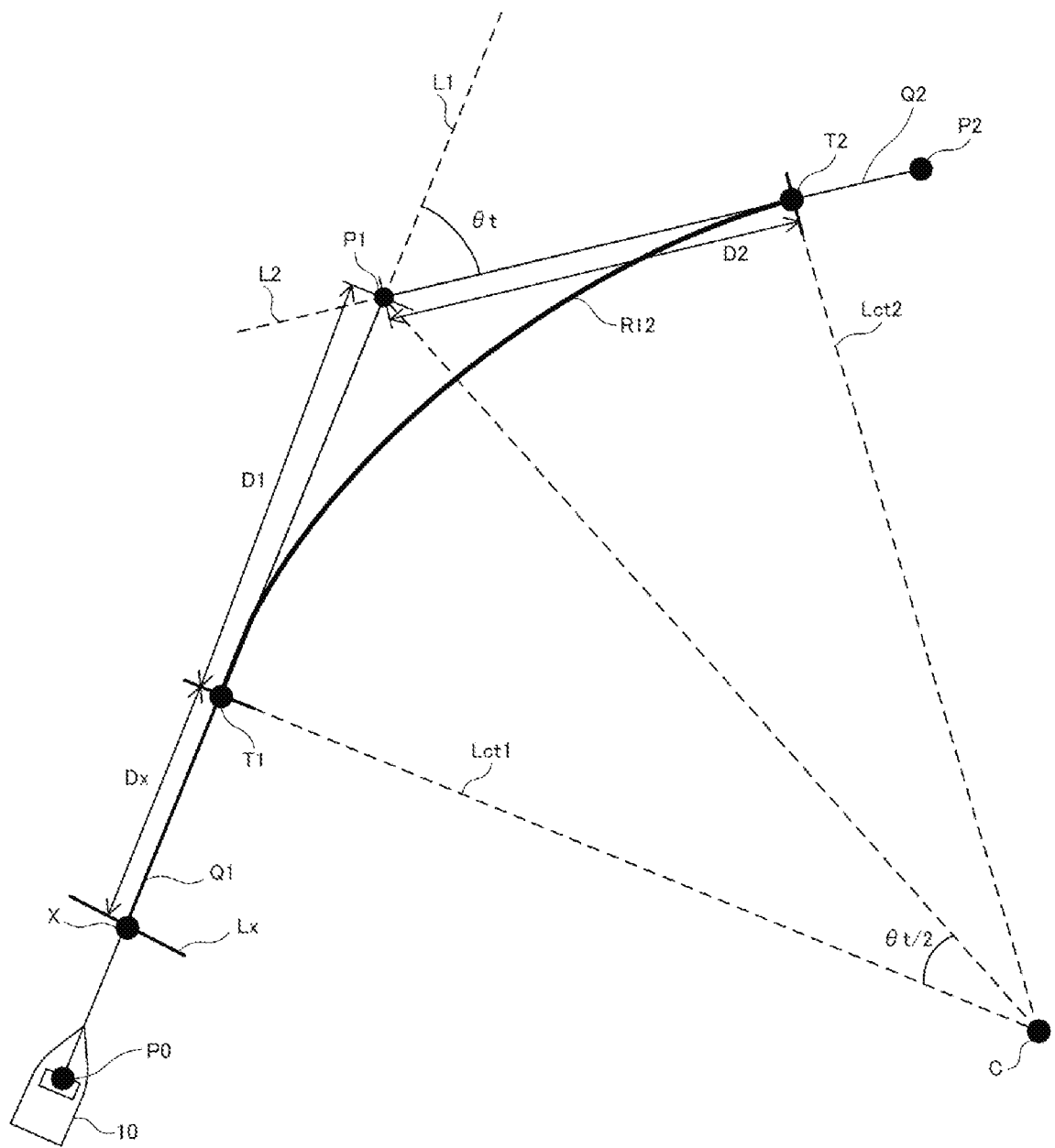
FIG. 2 is a view illustrating one example of a traveling route calculated by a route calculator according to the embodiment of the present disclosure.

FIG. 2 is a view illustrating one example of the traveling route calculated by the route calculator according to the embodiment of the present disclosure.

Referring to FIG. 2, the route calculator 13 identifies, for example, a target point (waypoint) P1 via which the ship 10 goes first, and a target point (waypoint) P2 via which the ship 10 goes next, among the plurality of target points P indicated by the target point information stored in the memory 12. The route calculator 13 may then calculate a route Q1 from the current position P0 of the ship 10 to the target point P1 and a route Q2 from the target point P1 to the target point P2 based on the respective positions of the identified target points P1 and P2.

The route calculator 13 may also calculate a route to turn a ship R12 via which the ship 10 goes when the ship 10 changes the route from the route Q1 to the route Q2. Here, one example of the route R12 calculated by the route calculator 13 will be described.

Figure 3:
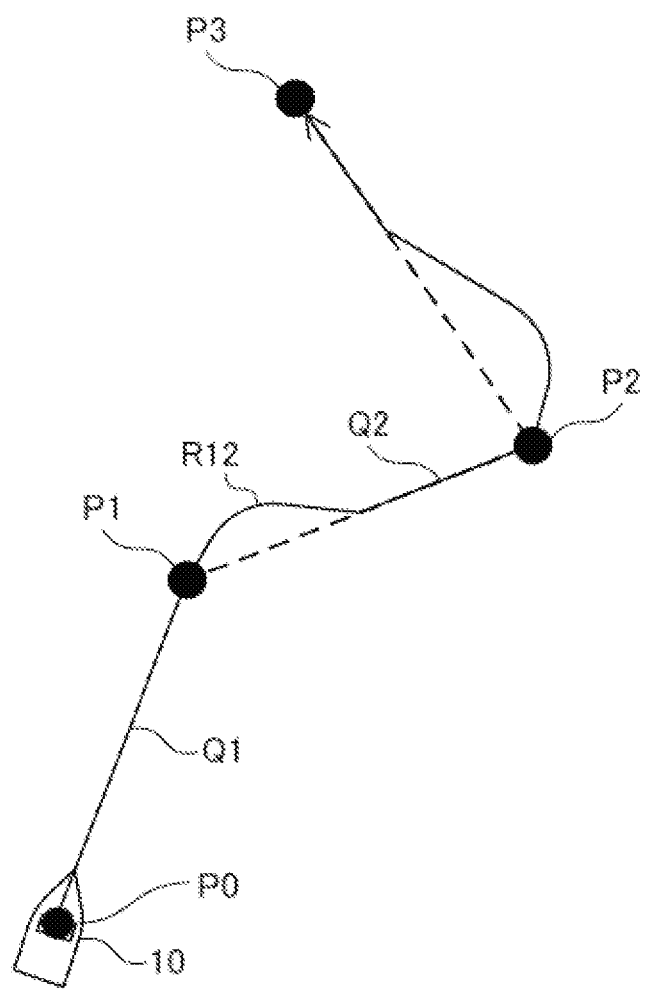
FIG. 3 is a view illustrating a comparative example of a route to turn a ship.
Figure 4:
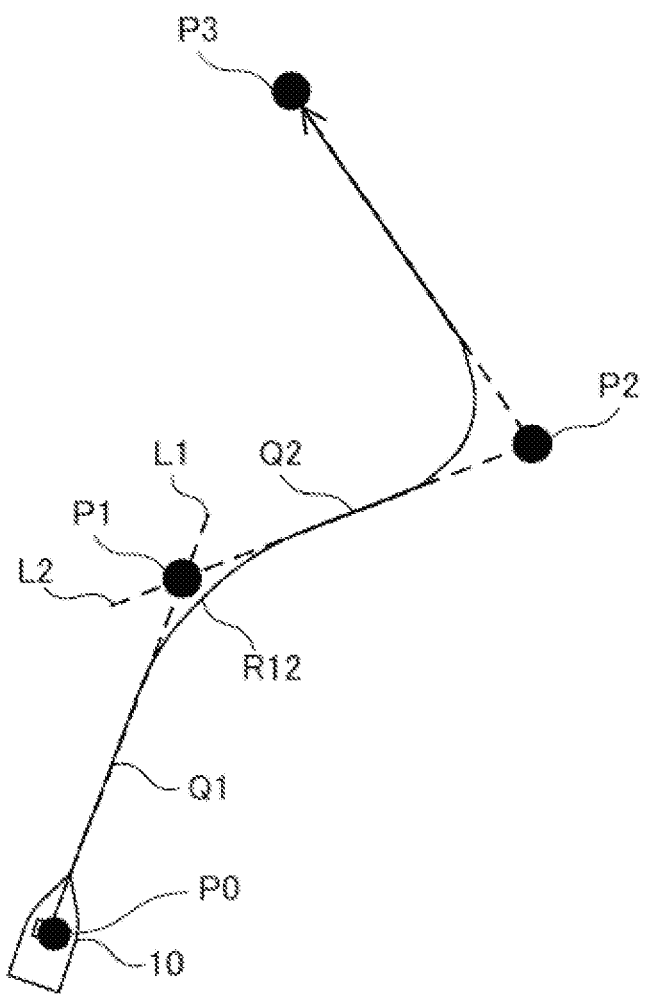
FIG. 4 is a view illustrating one example of the route calculated by the route calculator according to the embodiment of the present disclosure.

FIG. 3 is a view illustrating a comparative example of the route. FIG. 4 is a view illustrating one example of the route calculated by the route calculator according to the embodiment of the present disclosure. FIG. 3 illustrates a route R12 in a case where the ship 10 arrives at the target point P1, and then starts turning toward the target point P2. Moreover, FIG. 4 illustrates a route R12 in a case where the ship 10 starts turning before arriving at the target point P1.

Comparing the route R12 illustrated in FIG. 3 with the route R12 illustrated in FIG. 4, the route R12 illustrated in FIG. 4 is better and desirable in fuel consumption, riding comfort, etc. of the ship 10.

Referring again to FIG. 2, the route calculator 13 may then calculate, as the route R12, a route R12 which is a part of a circle inscribed inside a straight line L1 passing through the current position P0 of the ship 10 and the target point P1, and a straight line L2 passing through the target point P1 and the target point P2.

In more detail, the route calculator 13 may calculate an angle θt [deg] formed by the straight line L1 and the straight line L2 (hereinafter, referred to as a "veering angle").

If a traveling speed of the ship 10 (ship speed) is v [m/s], and for example, a turn rate of the ship 10 which is set by the user is Tr [deg/sec], a relation of a turning radius Dr which is a radius of the route R12, the ship speed v, and the turn rate Tr may satisfy the following Formula (1).

$$2 \times \pi \times Dr = \frac{360 \times v}{T_r} \quad (1)$$

The route calculator 13 may calculate the turning radius Dr using Formula (1).

Here, a boundary point between the route Q1 and the route R12 is T1, and a boundary point between the route Q2 and the route R12 is T2. The route calculator 13 may calculate a distance D1 between the boundary point T1 and the target point P1, a distance D2 between the target point P1 and the boundary point T2 according to the following Formula (2) using the veering angle θt and the turning radius Dr which are calculated.

$$D1 = D2 = Dr \times \tan\frac{\theta t}{2} \quad (2)$$

The route calculator 13 may also calculate the positions of the boundary point T1 and the boundary point T2 based on the calculated distance D1 and distance D2, and the position of the target point P1. Thus, the route calculator 13 can calculate the route R12 connecting the boundary point T1 and the boundary point T2 which are calculated.

The route Q1 up to the boundary point T1, the route R12 from the boundary point T1 to the boundary point T2, and the route Q2 from the boundary point T2, which are calculated by the route calculator 13, may correspond to the traveling route R.

(Calculation of Veering Start Line)

Here, when the ship 10 travels along the route R12, the traveling along the route R12 may be unable to be started if the start timing of the veering is too early or too late. For this reason, the route calculator 13 may calculate a point which is located before the boundary point T1 and at which the veering is to be started (hereinafter, referred to as a "veering start point X").

In more detail, for example, a time t2 is required until a constant turning begins after the ship 10 begins turning a rudder, i.e., until a turning at the specified turn rate Tr begins. Moreover, for example, a time t3 is required until the command steering angle for the steering mechanism 104 becomes a steering angle which can obtain a turning angular velocity at the turn rate Tr after the control for veering by the steering controlling module 15 illustrated in FIG. 1 is started.

The time t2 and the time t3 may be based on the response of the ship 10 to the command steering angle, specifically, based on at least one of the following performance T and the turning performance K of the ship 10. The following performance T and the turning performance K are, for example, actual measurements obtained by prior examinations using the ship 10, and are stored beforehand in the memory 12. Note that the following performance T and the turning performance K may be, for example, actual measurements obtained by prior examinations using a ship other than the ship 10.

The steering controlling module 15 may start the control of the steering mechanism 104 at a timing a period of time tx (=t2+t3) before the timing at which the ship 10 passes through the boundary point T1. Thus, the ship 10 can start more accurately the travel along the route R12.

The distance Dx between the veering start point X and the point T1 may satisfy the following Formula (3).

$$Dx = v \times tx \quad (3)$$

The route calculator 13 may calculate the position of the veering start point X according to Formula (3). The route calculator 13 may also calculate a veering start line Lx which is a straight line passing through the calculated veering start point X and perpendicular to the route Q1.

The position of the veering start line Lx typically varies according to the ship speed v etc. For this reason, the route calculator 13 may calculate and update the veering start line Lx, for example, periodically or irregularly.

The route calculator 13 may also calculate the position of an intersection In of a straight line Lct1 which passes through the boundary point T1 and intersects perpendicularly to the route Q1, and a straight line Lct2 which passes through the boundary point T2 and intersects perpendicularly to the route Q2, as the position of a center C of a circle having the route R12 as its part.

The route calculator 13 may then store in the memory 12 the route information indicative of the calculated traveling route R, the position of the boundary point T1, the position of the boundary point T2, the position of the center C, the position of the latest veering start line Lx, and the turning radius Dr.

[Processor]

Figure 5:
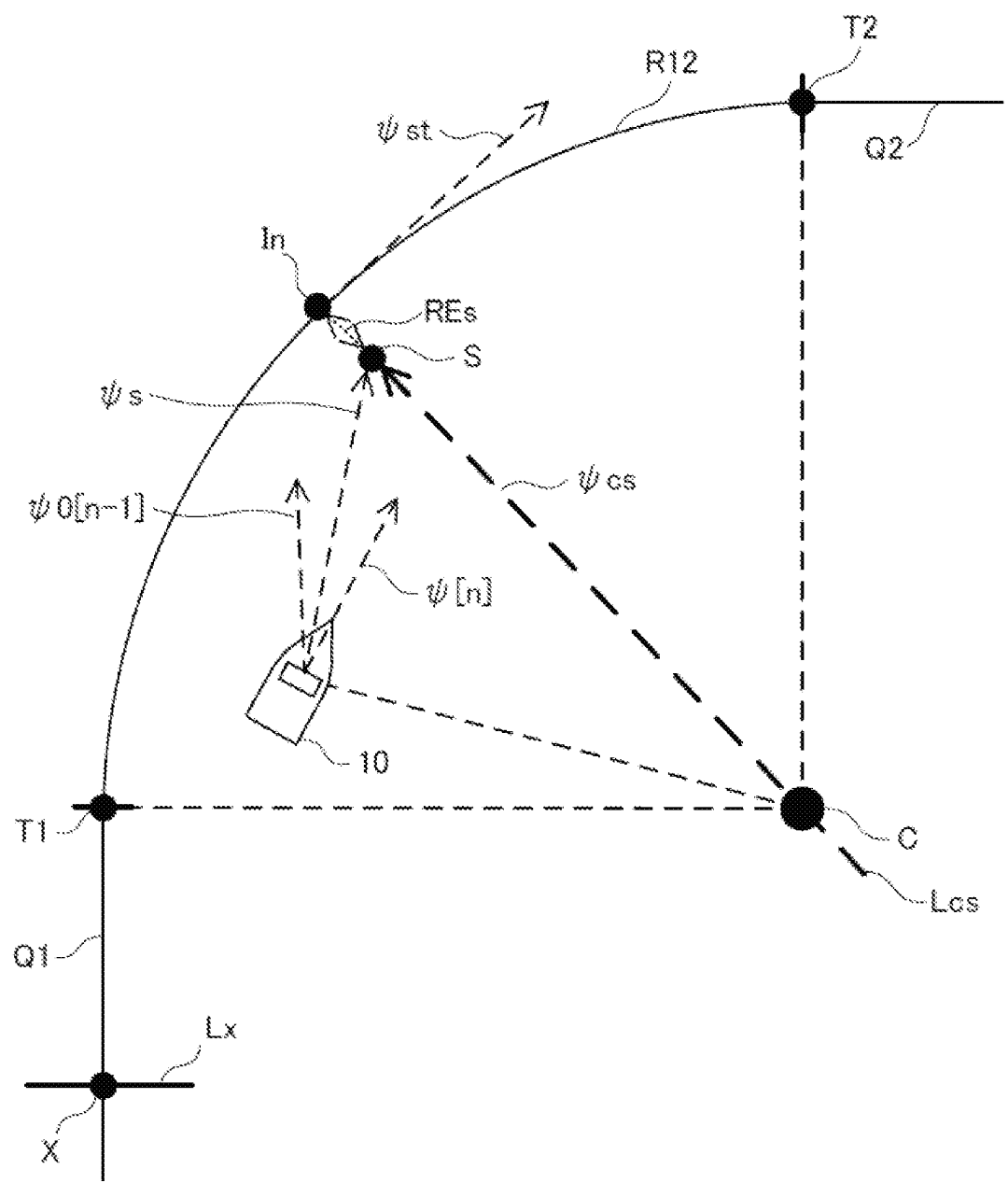
FIG. 5 is a view illustrating a method of calculating a command steering angle by a processor according to the embodiment of the present disclosure.

FIG. 5 is a view illustrating a method of calculating the command steering angle by the processor according to the embodiment of the present disclosure.

Referring to FIG. 5, the processor 14 may estimate a passing position forward of the ship 10 after the ship 10 passes the veering start line Lx, and then calculate a direction setting ψ0[n] based on a positional relation between the estimated passing position and the traveling route R.

Specifically, the processor 14 may calculate the intermediate waypoint S ahead of the ship 10 based on a current course setting ψ0[n−1], the bow direction ψ[n], and the ship speed v. The processor 14 may also calculate a course setting ψ0[n] for causing the ship 10 to travel along the route R12 in a case where the ship 10 is located at the calculated intermediate waypoint S.

The processor 14 may then calculate the command steering angle based on the calculated course setting ψ0[n]. The details of the calculation of the course setting ψ0[n] by the processor 14 will be described later.

(Mode Determining Module)

Referring to FIGS. 1 and 5, the mode determining module 21 of the processor 14 may determine the traveling mode of the ship 10 based on, for example, the positional information received from the GPS receiver 102, and the route information stored in the memory 12. Specifically, the mode determining module 21 may determine a NAV mode as the traveling mode of the ship 10, if it determines that the ship 10 is traveling before the veering start line Lx.

The mode determining module 21 may also determine a turning tracking mode as the traveling mode of the ship 10, if it determines that the ship 10 is traveling between the veering start line Lx and the boundary point T2.

Note that, instead of determining the traveling mode based on the positional information received from the GPS receiver 102, the mode determining module 21 may determine the traveling mode based on the bow direction ψ[n] indicated by the bow direction information received from the direction sensor 103, or a direction of a travel locus of the ship 10 (COG: Course of Ground).

For example, the mode determining module 21 may calculate a difference between a direction from the target point P1 to the target point P2 and the bow direction ψ[n] periodically or irregularly, and when the calculated difference becomes less than a given value, change the traveling mode from the turning tracking mode to the NAV mode.

(Intermediate Waypoint Calculating Module)

The intermediate waypoint calculating module 22 may calculate the intermediate waypoint S, when a given mode, i.e., the turning tracking mode is determined as the traveling mode by the mode determining module 21. On the other hand, if the NAV mode is determined as the traveling mode by the mode determining module 21, the intermediate waypoint calculating module 22 may not calculate the intermediate waypoint S.

When calculating the intermediate waypoint S, the intermediate waypoint calculating module 22 may calculate the intermediate waypoint S based on, for example, the current course setting ψ0[n−1] and the bow direction ψ[n].

Specifically, the intermediate waypoint calculating module 22 may calculate average values of the course setting ψ0[n−1] and the bow direction ψ[n] by using ψs[n] as a direction from the current position of the ship 10 to the intermediate waypoint S. That is, the intermediate waypoint calculating module 22 may calculate the direction ψs[n] according to the following Formula (4).

$$\phi_s[n] = \frac{(\phi_o[n-1] + \phi[n])}{2} \quad (4)$$

The intermediate waypoint calculating module 22 may also calculate a distance Ds from the current position P0 of the ship 10 to the intermediate waypoint S according to the following Formula (5).

$$D_S = v \times T_s \quad (5)$$

In Formula (5), v is the ship speed. Moreover, Ts is an estimated time required for travelling from the current position P0 of the ship 10 to the intermediate waypoint S.

The estimated time Ts may be a period of time based on the response of the ship to the command steering angle, more specifically, at least one of the following performance T and the turning performance K of the ship 10. The estimated time Ts satisfies, for example, the following Formula (6).

$$Ts = Ts_{base} \times \frac{T}{T_{base}} \times \frac{K}{K_{base}} \quad (6)$$

In Formula (6), Ts_base is a reference value of the estimated time. Moreover, T_base is a reference value of the following performance T. Moreover, K_base is a reference value of the turning performance K. Ts_base, T_base, and K_base are values acquired from simulations or experiments.

The intermediate waypoint calculating module 22 may also calculate the position of the intermediate waypoint S based on the current position P0 of the ship 10, the calculated direction ψs[n], and the calculated distance Ds. Here, the latitude and longitude of the current position of the ship 10 are "N_lat" and "N_lon," respectively, and the latitude and longitude of the intermediate waypoint S are "S_lat" and "S_lon," respectively.

In this case, latitude S_lat and longitude S_lon of the intermediate waypoint S may satisfy the following Formulas (7) and (8), respectively.

$$S_{lat} = N_{lat} + D_S \times \sin(\phi_s) \quad (7)$$

$$S_{lon} = N_{lon} + D_S \times \cos(\phi_s) \quad (8)$$

Here, a relation between the response of the ship to the command steering angle and the position of the intermediate waypoint S will be described.

Figure 6:
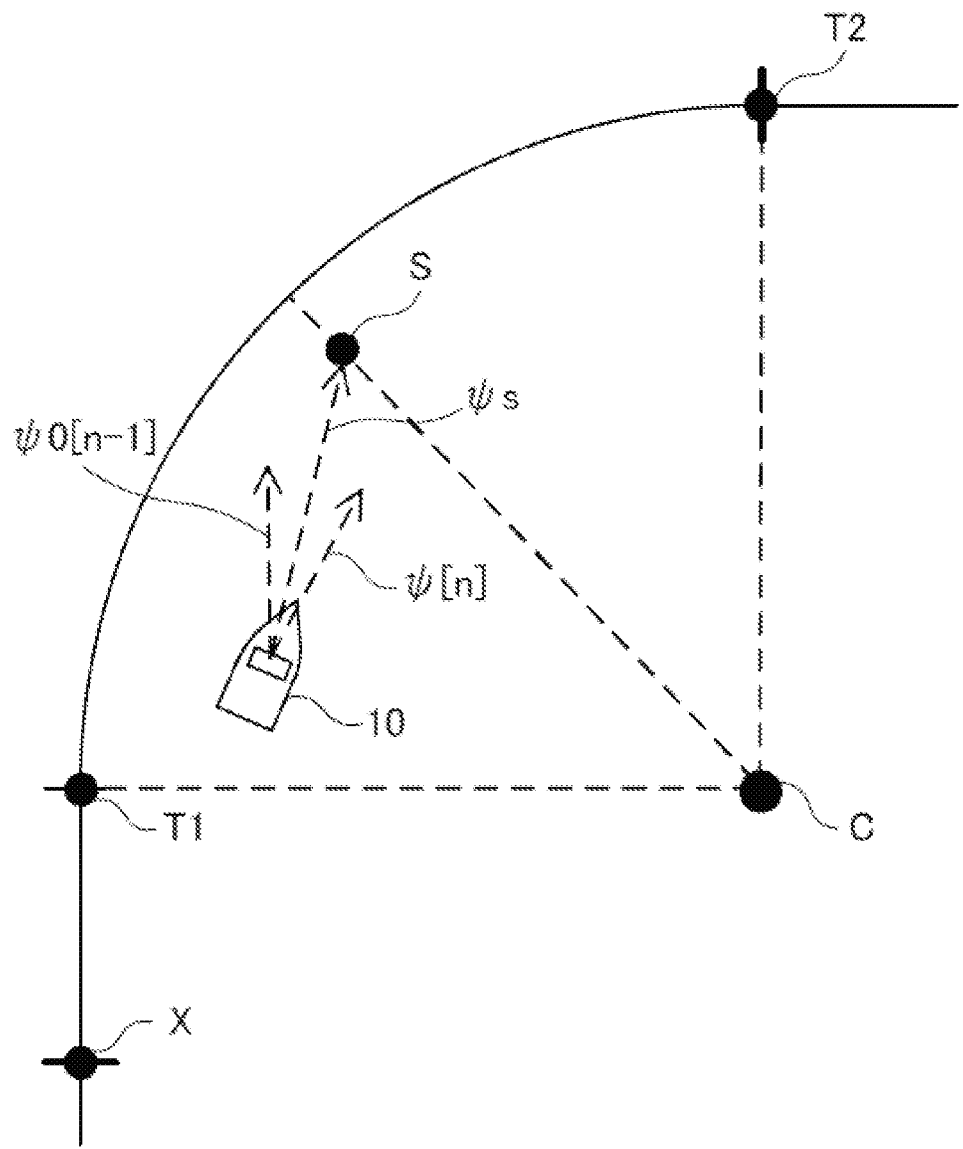
FIG. 6 is a view (1/2) illustrating a relation between a position of an intermediate waypoint calculated by an intermediate waypoint calculating module of the processor according to the embodiment of the present disclosure, and a response of a ship to the command steering angle.

FIG. 6 is a view (1/2) illustrating a relation between the position of the intermediate waypoint calculated by the intermediate waypoint calculating module of the processor according to the embodiment of the present disclosure, and the response of the ship to the command steering angle.

Figure 7:
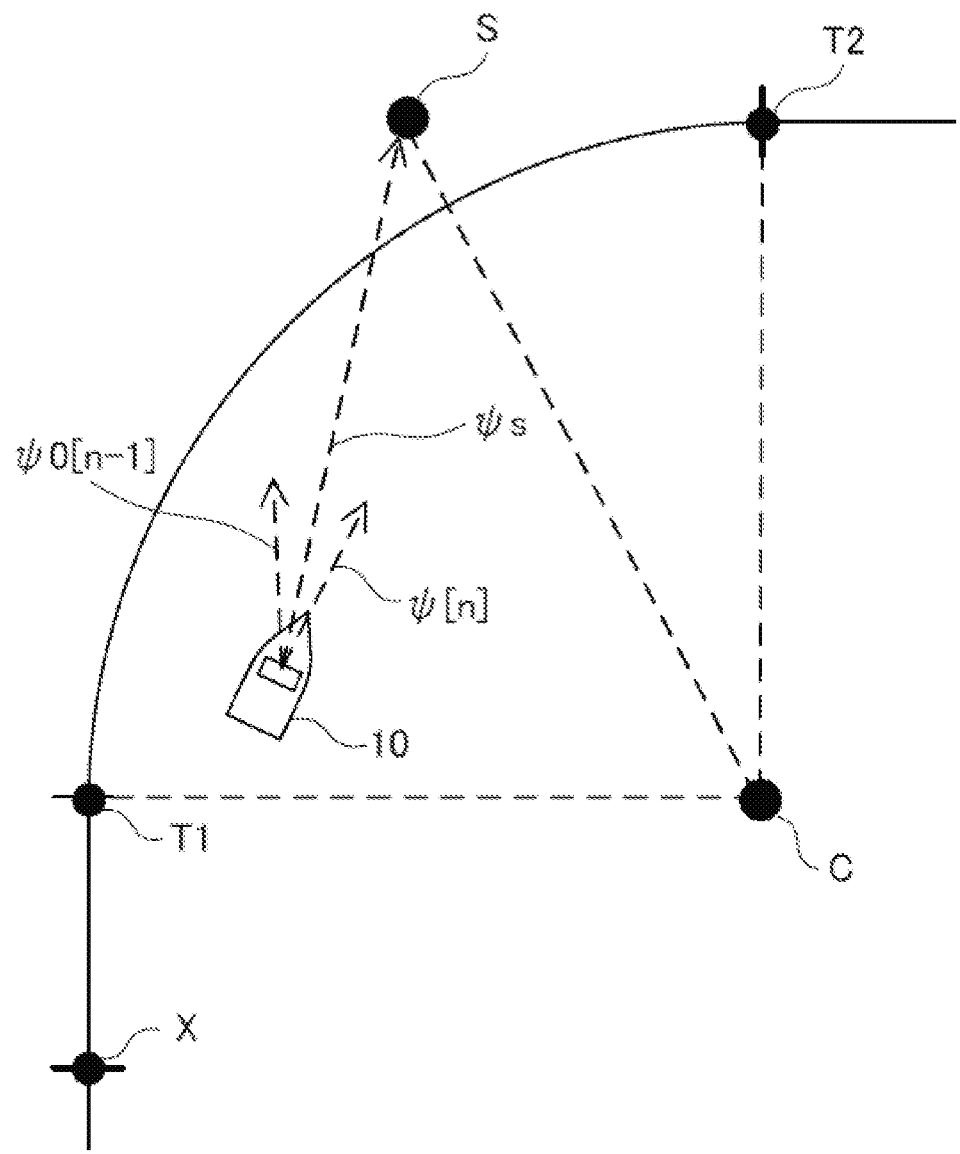
FIG. 7 is a view (2/2) illustrating the relation between the position of the intermediate waypoint calculated by the intermediate waypoint calculating module of the processor according to the embodiment of the present disclosure, and the response of the ship to the command steering angle.

FIG. 7 is a view (2/2) illustrating the relation between the position of the intermediate waypoint calculated by the intermediate waypoint calculating module of the processor according to the embodiment of the present disclosure, and the response of the ship to the command steering angle.

FIG. 6 illustrates the position of the intermediate waypoint S when the response of the ship 10 to the command steering angle is good, i.e., when the values of the following performance T and the turning performance K are large. FIG. 7 illustrates the position of the intermediate waypoint S when the response of the ship 10 to the command steering angle is poor, i.e., when the values of the following performance T and the turning performance K are small.

Referring to FIGS. 6 and 7, when the response of the ship 10 to the command steering angle is good, since the distance Ds becomes shorter, the position of the intermediate waypoint S may be calculated as a position close to the current position P0 of the ship 10. On the other hand, when the response of the ship 10 to the command steering angle is poor, since the distance Ds becomes longer, the position of the intermediate waypoint S may be calculated as a position distant from the current position P0 of the ship 10.

Thus, the intermediate waypoint calculating module 22 can calculate the position of the intermediate waypoint S more appropriately in consideration of the response of the ship 10 to the command steering angle.

Note that the intermediate waypoint calculating module 22 is not limited to such a configuration to calculate the intermediate waypoint S using the response of the ship 10 to the command steering angle, but may calculate the intermediate waypoint S, for example, using an arbitrary value instead of the response.

Moreover, the intermediate waypoint calculating module 22 is not limited to such a configuration to calculate the intermediate waypoint S using the ship speed v, but may calculate the intermediate waypoint S, for example, using an arbitrary value instead of the ship speed v.

Moreover, the intermediate waypoint calculating module 22 is not limited to such a configuration to calculate the intermediate waypoint S using the course setting ψ0[n−1] and the bow direction ψ[n], but may calculate the intermediate waypoint S without using at least one of of the course setting ψ0[n−1] and the bow direction ψ[n].

(Command Steering Angle Calculation)

Referring again to FIG. 5, the command steering angle calculating module 23 may calculate the course setting ψ0[n], for example, using a technique of feedback control, such as a PID (Proportional Integral Differential) control, and then calculate the command steering angle based on the calculated course setting ψ0[n].

The command steering angle calculating module 23 may also change the method of calculating the command steering angle according to the traveling mode determined by the mode determining module 21. As described above, the mode determining module 21 may change the traveling mode between before and after the timing at which the ship 10 is located on the veering start line Lx. For this reason, the command steering angle calculating module 23 may change the method of calculating the course setting ψ0[n] and the command steering angle before and after the timing. In more detail, the command steering angle calculating module 23 may change the method of calculating the command steering angle from a calculating method without using the indirect destination S into a calculation method using the indirect destination S, before and after the arrival of the ship 10 at the veering start line Lx.

(a) In Case of NAV Mode

When the ship 10 is traveling in the NAV mode, the command steering angle calculating module 23 may calculate the course setting ψ0[n] based on the current bow direction ψ[n], and a deviation XTE of the route Q1 or the route Q2 and the current position P0 of the ship 10 (cross track error).

That is, the command steering angle calculating module 23 may calculate the course setting ψ0[n] using the following Formula (9).

$$\phi_o[n] = \phi[n] \pm \alpha \times XTE \quad (9)$$

In Formula (9), α is a proportional coefficient.

Moreover, in Formula (9), when the current position P0 of the ship 10 is deviated from the route Q1 or the route Q2 in the clockwise direction, a minus coefficient is adopted as α. On the other hand, when the current position P0 of the ship 10 is deviated from the route Q1 or the route Q2 in the counterclockwise direction, a plus coefficient is adopted as α.

Moreover, the command steering angle calculating module 23 may calculate the command steering angle to the steering mechanism 104 based on the calculated course setting ψ0[n]. For example, the command steering angle calculating module 23 calculates a value obtained by subtracting the bow direction ψ[n] from the course setting ψ0[n], as the command steering angle. The command steering angle calculating module 23 may then output the command steering angle information indicative of the calculated command steering angle to the steering controlling module 15.

The command steering angle calculating module 23 may calculate and update the course setting ψ0[n] and the command steering angle periodically or irregularly, while the ship 10 is traveling in the NAV mode.

(b) In Case of Turning Tracking Mode (b-1) Traveling from Veering Start Line Lx to Boundary Point T1

The command steering angle calculating module 23 examines, for example, the positional information received from the GPS receiver 102. If the command steering angle calculating module 23 determines that the ship 10 travels in the turning tracking mode, and travels between the veering start line Lx and the boundary point T1, it may then be calculated the course setting ψ0[n] based on the positions of the intermediate waypoint S and the center C, and a deviation XTE of the current position P0 of the ship 10 from the route Q1.

In more details, the command steering angle calculating module 23 may calculate a direction ψcs of a straight line Lcs passing through the center C and the intermediate waypoint S using the latitude S_lat and the longitude S_lon of the intermediate waypoint S, and the latitude C_lat and the longitude C_lon of the center C.

That is, the command steering angle calculating module 23 may calculate the direction ψcs of the straight line Lcs using the following Formula (10).

$$\phi_{cs}[n] = \tan^{-1}\left(\frac{S_{lon} - C_{lon}}{S_{lat} - C_{lat}}\right) \quad (10)$$

Moreover, the command steering angle calculating module 23 may calculate a tangent direction ψst at the intersection In of the straight line Lcs and the route R12 using the calculated direction ψcs. The tangent direction ψst may satisfy the following Formula (11).

$$\phi_{st}[n] = \phi_{cs}[n] \pm \frac{\pi}{2} \quad (11)$$

The command steering angle calculating module 23 may then calculate the course setting ψ0[n] using the calculated direction ψcs. The new course setting ψ0[n] may satisfy the following Formula (12).

$$\phi_o[n] = \phi_{st}[n] \pm \alpha \times XTE \quad (12)$$

In Formula (12), when the current position P0 of the ship 10 is deviated from the route Q1 in the clockwise direction, a minus coefficient is adopted as α, and when the current position P0 of the ship 10 is deviated from the route Q1 in the counterclockwise direction, a plus coefficient is adopted as α.

Moreover, based on the calculated course setting ψ0[n], the command steering angle calculating module 23 may calculate the command steering angle to the steering mechanism 104, and then output command steering angle information indicative of the calculated command steering angle to the steering controlling module 15. The command steering angle calculating module 23 may calculate and updates the course setting ψ0[n] and the command steering angle periodically or irregularly, while the ship 10 is traveling in the turning tracking mode.

(b-2) Traveling from Boundary Point T1 to Boundary Point T2

The command steering angle calculating module 23 examines, for example, the positional information received from the GPS receiver 102. If the command steering angle calculating module 23 determines that the ship 10 travels in the turning tracking mode, and travels between the boundary point T1 and the boundary point T2, it may then calculate the course setting ψ0[n] based on the positions of the intermediate waypoint S and the center C, and a deviation REs[n] of the current position P0 of the ship 10 from the route R12.

In more detail, similar to the case of (b-1), the command steering angle calculating module 23 may calculate the direction ψcs of the straight line Lcs passing through the center C and the intermediate waypoint S using the latitude S_lat and the longitude S_lon of the intermediate waypoint S, and the latitude C_lat and the longitude C_lon of the center C.

Moreover, the command steering angle calculating module 23 may calculate the tangent direction ψst at the intersection In of the straight line Lcs and the route R12 using the calculated direction ψcs.

The command steering angle calculating module 23 may then calculate the new course setting ψ0[n] using the calculated direction ψcs. The new course setting ψ0[n] may satisfy the following formulas (13) and (14).

$$\phi_o[n] = \phi_{st}[n] \pm (\alpha \times REs[n] - \beta \times \Delta REs) \quad (13)$$

$$\Delta REs = REs[n] - REs[n-1] \quad (14)$$

In Formula (13), REs[n] is a distance between the intermediate waypoint S and the intersection In, i.e., a distance between the intermediate waypoint S and the route R12. Moreover, in Formula (14), REs[n−1] is a distance between the intermediate waypoint S and the route R12 which are calculated previously.

Moreover, in Formula (13), when the current position P0 of the ship 10 is deviated from the route Q1 in the clockwise direction, a minus coefficient may be adopted, and when the current position P0 of the ship 10 is deviated from the route Q1 in the counterclockwise direction, a plus coefficient may be adopted.

Moreover, the command steering angle calculating module 23 may calculate the command steering angle to the steering mechanism 104 based on the calculated course setting ψ0[n], and then output the command steering angle information indicative of the calculated command steering angle to the steering controlling module 15. The command steering angle calculating module 23 may calculate and update the course setting ψ0[n] and the command steering angle periodically or irregularly, while the ship 10 is traveling in the turning tracking mode.

Note that the command steering angle calculating module 23 may set a lower limit of the new course setting ψ0[n].

For example, the intermediate waypoint S calculated two times before by the intermediate waypoint calculating module 22 is set to S[n-2], the intermediate waypoint S calculated last time is set to S[n-1], and the newly calculated intermediate waypoint S is set to S[n]. Moreover, the direction from the intermediate waypoint S[n-2] to the intermediate waypoint S[n-1] is set to ψleg1, and the direction from the intermediate waypoint S[n-1] to the intermediate waypoint S[n] is set to ψleg2.

When the ship 10 is turning in the clockwise direction, if the calculated course setting ψ0[n] satisfies the following Formula (15), the command steering angle calculating module 23 may change the course setting ψ0[n] according to the following Formula (16).

$$\phi_o[n] < \phi_{leg1} + \frac{(\phi_{leg2} - \phi_{leg1})}{2} \quad (15)$$

$$\phi_o[n] = \phi_{leg1} + \frac{(\phi_{leg2} - \phi_{leg1})}{2} \quad (16)$$

Moreover, when the ship 10 is turning in the counterclockwise direction, if the calculated course setting ψ0[n] satisfies the following Formula (17), the command steering angle calculating module 23 may change the course setting ψ0[n] according to the following Formula (18).

$$\phi_o[n] < \phi_{leg1} - \frac{(\phi_{leg2} - \phi_{leg1})}{2} \quad (17)$$

$$\phi_o[n] = \phi_{leg1} - \frac{(\phi_{leg2} - \phi_{leg1})}{2} \quad (18)$$

Note that the command steering angle calculating module 23 may be configured to calculate the command steering angle based on the positional relation between the route R12 and the intermediate waypoint S, and therefore, the method of calculating the command steering angle by the command steering angle calculating module 23 is not limited to the method described above.

<Flow of Operation>

The automatic steering device 101 may be provided with a computer, and a processor, such as a CPU in the computer, read a command steering angle calculation program including a part or all of steps of the following flowchart from, for example, the memory 12, and execute it. The command steering angle calculation program may also be installed from the outside. Moreover, the command steering angle calculation program may be distributed in a state where it is stored in a recording medium.

Figure 8:
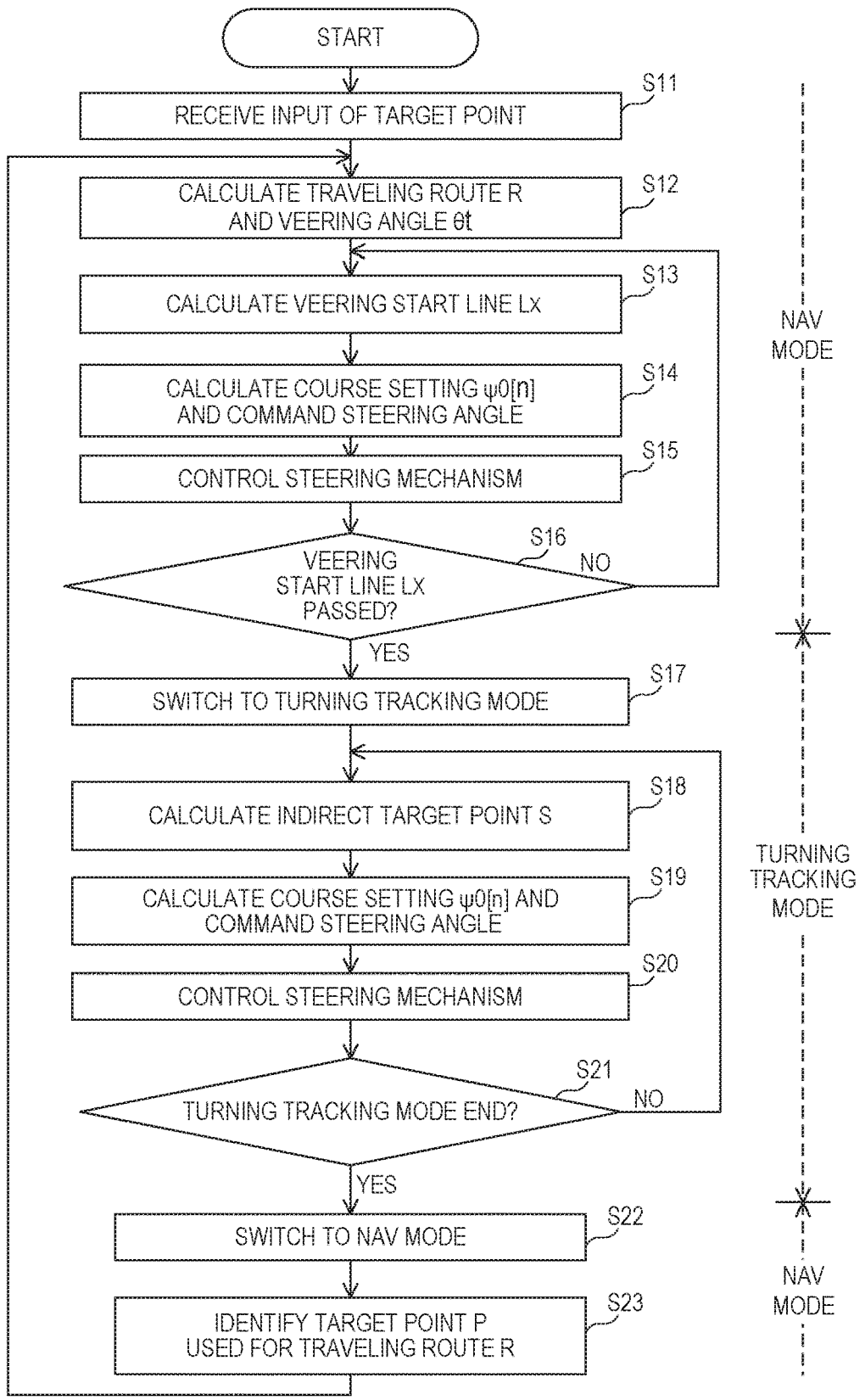
FIG. 8 is a flowchart illustrating a flow of operation executed by the automatic steering device according to the embodiment of the present disclosure.

FIG. 8 is a flowchart illustrating a flow of operation executed by the automatic steering device according to the embodiment of the present disclosure.

Referring to FIGS. 1 and 8, the input receiver 11 may first receive the input of the plurality of target points P by the user, and store the target point information indicative of the positions of the received target points P in the memory 12 (Step S11).

Next, the route calculator 13 may calculate the traveling route R, for example, based on the target point information stored in the memory 12. Specifically, the route calculator 13 may identify, among the plurality of target points P indicated by the target point information, the target point P1 via which the ship 10 goes first, and the target point P2 via which the ship 10 goes next, and then calculate the route Q1, the route Q2, and the route R12 based on the positions of the identified target points P1 and P2.

The route calculator 13 may then calculate the veering angle θt which is an angle formed by the straight line L1 passing through the current position P0 of the ship 10 and the target point P1 and the straight line L2 passing through the target point P1 and the target point P2, for example, based on the positional information received from the GPS receiver 102 (Step S12).

Next, the route calculator 13 may calculate the veering start line Lx based on the calculated traveling route R (Step S13).

Next, the command steering angle calculating module 23 may calculate the course setting ψ0[n] which satisfies Formula (9), for example, based on the bow direction ψ[n] indicated by the bow direction information received from the direction sensor 103. The command steering angle calculating module 23 may then calculate the command steering angle to the steering mechanism 104 based on the calculated new course setting ψ0[n], and output the command steering angle information indicative of the calculated command steering angle to the steering controlling module 15 (Step S14).

Next, the steering controlling module 15 may receive the command steering angle information from the command steering angle calculating module 23, and control the steering mechanism 104 so that the steering angle of the steering mechanism 104 becomes the command steering angle indicated by the command steering angle information to cause the ship 10 to travel in the NAV mode (Step S15).

Next, the mode determining module 21 of the processor 14 may examine, for example, the distance between the veering start line Lx, which is calculated by the route calculator 13, and the current position P0 of the ship 10. If the mode determining module 21 determines that the ship 10 has not passed the veering start line Lx ("NO" at Step S16), it may then continue the traveling in the NAV mode of the ship 10 (Steps S13-S16).

On the other hand, if the mode determining module 21 determines that the ship 10 passed the veering start line Lx ("YES" at Step S16), it may then notify to the intermediate waypoint calculating module 22 and the command steering angle calculating module 23 that the traveling mode of the ship 10 is switched from the NAV mode to the turning tracking mode (Step S17).

Next, when the notice of switching the traveling mode to the turning tracking mode is received from the mode determining module 21, the intermediate waypoint calculating module 22 may calculate the position of the intermediate waypoint S using Formulas (4) to (8), and then output to the command steering angle calculating module 23 the intermediate waypoint information indicative of the calculated position (Step S18).

Next, when the command steering angle calculating module 23 receives from the mode determining module 21 the notice of switching the traveling mode of the ship 10 from the NAV mode to the turning tracking mode, and further receives the intermediate waypoint information from the intermediate waypoint calculating module 22, it may then examine the current position P0 of the ship 10, for example, based on the positional information received from the GPS receiver 102.

If the ship 10 has not passed the boundary point T1, the command steering angle calculating module 23 may then calculate the course setting ψ0[n] using Formulas (10) to (12). On the other hand, if the ship 10 passed the boundary point T1, the command steering angle calculating module 23 may then calculate the course setting ψ0[n] using Formulas (10), (11), and (13).

The command steering angle calculating module 23 may then calculate the command steering angle to the steering mechanism 104 based on the calculated new course setting ψ0[n], and output the command steering angle information indicative of the calculated command steering angle to the steering controlling module 15 (Step S19).

Next, the steering controlling module 15 may receive the command steering angle information from the command steering angle calculating module 23, and control the steering mechanism 104 so that the steering angle of the steering mechanism 104 becomes the command steering angle indicated by the command steering angle information (Step S20).

Next, the mode determining module 21 may determine whether the turning tracking mode is to be ended, for example, based on the positional information received from the GPS receiver 102 (Step S21). If the mode determining module 21 determines that, for example, the ship 10 has not passed the boundary point T2, it may then determine that the turning tracking mode is to be continued ("NO" at Step S21), and continue the travelling in the turning tracking mode of the ship 10 (Steps S18-S21).

On the other hand, if the mode determining module 21 determines that, for example, the ship 10 passed the boundary point T2, it may then determine that the turning tracking mode is to be ended ("YES" at Step S21), and notify to the intermediate waypoint calculating module 22 and the command steering angle calculating module 23 that the traveling mode of the ship 10 is switched from the turning tracking mode to the NAV mode (Step S22).

Next, the route calculator 13 may identify, among the plurality of target points P indicated by the target point information stored in the memory 12, the target point P3 via which the ship 10 goes next of the target point P2, as the target point to be used for the generation of the new traveling route R (Step S23). The route calculator 13 may then newly calculate the traveling route R and the veering angle θt based on the positions of the target point P2 and the target point P3 (Step S12). Then, the operation after Step S13 may be again executed.

Note that, the calculation of the intermediate waypoint S by the intermediate waypoint calculating module 22 (Step S18) and the determination of whether the turning tracking mode is to be ended by the mode determining module 21 (Step S21) may be executed asynchronously.

Meanwhile, when causing the ship to travel along the traveling route connecting the plurality of preset target points, the ship may be unable to travel along the desired route after the start of veering due to the external factors, such as waves.

Regarding this problem, in the automatic steering device 101 according to the embodiment of the present disclosure, the route calculator 13 may calculate the route R12 of the ship 10 based on the positions of the plurality of target points P. The intermediate waypoint calculating module 22 may calculate the intermediate waypoint S ahead of the ship 10. The command steering angle calculating module 23 may calculate the command steering angle based on the positional relation between the route R12 calculated by the route calculator 13 and the intermediate waypoint S calculated by the intermediate waypoint calculating module 22. The steering controlling module 15 may then control the steering mechanism 104 of the ship 10 based on the command steering angle calculated by the command steering angle calculating module 23.

Thus, since the intermediate waypoint S which is the passing position of the ship 10 is estimated, and the command steering angle is calculated based on the positional relation between the estimated intermediate waypoint S and the route R12, the command steering angle when the ship 10 arrives at the intermediate waypoint S can be calculated prior to arriving of the ship 10 at the intermediate waypoint S. For this reason, for example, even if it takes a time for the ship 10 to actually start the turning according to the command steering angle after the start of the control of the steering mechanism 104 according to the command steering angle, the turning can be started at the desired point more certainly.

Therefore, in the automatic steering device 101 according to the embodiment of the present disclosure, the traveling along the route R12 can be performed more accurately.

Moreover, in the automatic steering device 101 according to the embodiment of the present disclosure, the intermediate waypoint calculating module 22 may calculate the intermediate waypoint S based on the response of the ship 10 to the command steering angle.

Thus, the position of the intermediate waypoint S can be calculated more accurately in consideration of the operating time according to the performance of the ship 10.

Moreover, in the automatic steering device 101 according to the embodiment of the present disclosure, the intermediate waypoint calculating module 22 may calculate the intermediate waypoint S based on the ship speed v.

By such a configuration, the more accurate position of the intermediate waypoint S can be calculated according to the current ship speed v.

Moreover, in the automatic steering device 101 according to the embodiment of the present disclosure, the intermediate waypoint calculating module 22 may calculate the intermediate waypoint S based on the course setting ψ0[n−1] of the ship 10 and the current bow direction ψ[n] of the ship 10.

By such a configuration, since the more accurate course of the ship 10 can be grasped, the position of the intermediate waypoint S can be calculated more accurately.

Moreover, in the automatic steering device 101 according to the embodiment of the present disclosure, the command steering angle calculating module 23 may calculate the command steering angle based on the tangent direction ψst at the intersection In of the straight line Lcs passing through the center C of the circle having the route R12 as its part and the intermediate waypoint S, and the route R12.

By such a configuration, the course setting ψ0[n] when the ship 10 arrives at the intermediate waypoint S can be calculated, without performing the complicated arithmetic processing.

Moreover, in the automatic steering device 101 according to the embodiment of the present disclosure, the command steering angle calculating module 23 may calculate the command steering angle further based on the distance REs between the intermediate waypoint S and the intersection In.

Thus, since the tangent direction ψst can be corrected using the distance REs which is the deviation of the intermediate waypoint S from the route R12, the more suitable command steering angle can be calculated.

Moreover, in the automatic steering device 101 according to the embodiment of the present disclosure, the command steering angle calculating module 23 may calculate and update the command steering angle periodically or irregularly.

By such a configuration, the more suitable command steering angle according to the temporal change of the bow direction ψ[n] etc. of the ship 10 can be calculated.

Moreover, in the automatic steering device 101 according to the embodiment of the present disclosure, the command steering angle calculating module 23 may change the method of calculating the command steering angle from the calculation method without using the indirect destination point S into the calculation method using the indirect destination point S, before and after the ship 10 arrives at the veering start point X located before the boundary point T1 which is the starting position of the route R12.

By such a configuration, for example, when the route to travel is a straight line, the command steering angle may be calculated by the simple arithmetic processing to reduce the operation load, and, on the other hand, when the route to travel is an arc, the command steering angle can be calculated more accurately by the arithmetic processing using the differential coefficient etc., to cause the ship to travel on the traveling route.

Moreover, in the automatic steering device 101 according to the embodiment of the present disclosure, the steering controlling module 15 may start the control of the steering mechanism 104 based on the command steering angle, before the ship 10 starts the traveling of the arc-shaped route R12.

By such a configuration, the ship 10 can start more accurately the traveling along the route R12.

Moreover, in the automatic steering device 101 according to the embodiment of the present disclosure, the display signal generating module 16 may generate the display signal for displaying the route R12 and the intermediate waypoint S on the external apparatus.

By such a configuration, for example, the positions of the route R12 and the intermediate waypoint S can be easily grasped by checking the screen displayed on the monitor of the external apparatus.

Moreover, in the automatic steering method according to the embodiment of the present disclosure, the route calculator 13 may first calculate the route R12 of the ship 10 based on the positions of the plurality of target points P. Next, the intermediate waypoint calculating module 22 may calculate the intermediate waypoint S ahead of the ship 10. Next, the command steering angle calculating module 23 may calculate the command steering angle based on the positional relation between the route R12 calculated by the route calculator 13 and the intermediate waypoint S calculated by the intermediate waypoint calculating module 22. Then, the steering controlling module 15 may control the steering mechanism 104 of the ship 10 based on the command steering angle calculated by the command steering angle calculating module 23.

Thus, by the method of estimating the intermediate waypoint S which is the passing position of the ship 10 and calculating the command steering angle based on the positional relation between the estimated intermediate waypoint S and the route R12, the command steering angle when the ship 10 arrives at the intermediate waypoint S can be calculated before the ship 10 arrives at the intermediate waypoint S. For this reason, for example, even if it takes a time for the ship 10 to actually start the turning according to the command steering angle after the start of the control of the steering mechanism 104 according to the command steering angle, the turning can be started at the desired point more certainly.

Therefore, in the automatic steering method according to the embodiment of the present disclosure, the traveling along the route R12 can be performed more accurately.

It should be thought that the above embodiment is merely illustration in all respects and not restrictive. The scope of the present disclosure is defined by not the above description but the claims, and it is intended to encompass the claims, and all the modifications within the scope and equivalents.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

What is claimed is:

1. An automatic steering device, comprising:
processing circuitry configured to:
calculate a route to turn a ship based on positions of a plurality of waypoints,
calculate a first command steering angle in accordance with a first calculation before the ship passes a boundary point on the route, and control a rudder of the ship based on the first command steering angle,
upon the ship passing the boundary point:
calculate and repeatedly update an intermediate waypoint ahead of the ship while the ship is turning around an identified waypoint from among the plurality of waypoints, calculate a second command steering angle in accordance with a second calculation based on a positional relation between the route and the intermediate waypoint, and control the rudder of the ship based on the second command steering angle, the processing circuitry being configured to calculate and repeatedly update the intermediate waypoint based on a formula which calculates the intermediate waypoint so that a length between a current position of the ship and the intermediate waypoint becomes shorter in proportion to a degree of a response of the ship to the second command steering angle, wherein the first calculation includes calculating a direction ψcs of a straight line Lcs passing through a center C and the intermediate waypoint S using the latitude S_lat and the longitude S_lon of the intermediate waypoint S, and the latitude C_lat and the longitude C_lon of the center C according to the following formula (10)

$$\phi_{cs}[n] = \tan^{-1}\left(\frac{S_{lon} - C_{lon}}{S_{lat} - C_{lat}}\right) \quad (10)$$

calculating a tangent direction ψst at an intersection In of the straight line Lcs and the route R12 using the calculated direction ψcs according to the following formula (11)

$$\phi_{st}[n] = \phi_{cs}[n] \pm \frac{\pi}{2}, \text{ and} \quad (11)$$

calculating a course setting ψ0[n] using the calculated direction ψcs according to the following formula (12)

$$\phi_o[n] = \phi_{st}[n] \pm \alpha \times XTE, \quad (12)$$

such that when the current position of the ship is deviated from the route in a clockwise direction, a minus coefficient is adopted as α, and when the current position of the ship is deviated from the route in a counterclockwise direction, a plus coefficient is adopted as α, and XTE represents a deviation error of the route and the current position of the ship.

2. The automatic steering device of claim 1, wherein the processing circuitry is further configured to:
calculate the intermediate waypoint based on a speed of the ship.

3. The automatic steering device of claim 2, wherein the processing circuitry is further configured to: change a method of calculating the command steering angle from a calculating method not using the intermediate waypoint into a calculation method using the intermediate waypoint, when the ship arrives at a veering start point before a starting position of the route.

4. The automatic steering device of claim 1, wherein the processing circuitry is further configured to:
calculate the intermediate waypoint based on a set heading of the ship and a current heading of the ship.

5. The automatic steering device of claim 1, wherein the processing circuitry is further configured to:

calculate the command steering angle based on a tangent direction at an intersection of a virtual straight line and the route, the virtual straight line passing through a center of a virtual circle comprising the route and the intermediate waypoint.

6. The automatic steering device of claim 5, wherein the processing circuitry is further configured to:
calculate the command steering angle further based on a distance between the intermediate waypoint and the intersection.

7. The automatic steering device of claim 1, wherein the processing circuitry is further configured to:
update the calculation of the command steering angle periodically or aperiodically.

8. The automatic steering device of claim 1, wherein the processing circuitry is further configured to:
change a method of calculating the command steering angle from a calculating method not using the intermediate waypoint into a calculation method using the intermediate waypoint, when the ship arrives at a veering start point before a starting position of the route.

9. The automatic steering device of claim 1, wherein the processing circuitry is further configured to:
start the control of the rudder based on the command steering angle before the ship starts traveling on the route having an arc shape.

10. The automatic steering device of claim 2, wherein the processing circuitry is further configured to:
start the control of the rudder based on the command steering angle before the ship starts traveling on the route having an arc shape.

11. The automatic steering device of claim 1, wherein the processing circuitry is further configured to:
generate a display signal of the route and the intermediate waypoint.

12. The automatic steering device of claim 10, wherein the processing circuitry is further configured to:
generate a display signal of the route and the intermediate waypoint.

13. The automatic steering device of claim 1, wherein the second calculation includes
calculating the direction ψcs of a straight line Lcs passing through the center C and the intermediate waypoint S using the latitude S_lat and the longitude S_lon of the intermediate waypoint S, and the latitude C_lat and the longitude C_lon of the center C according to the following formula (10)

$$\phi_{cs}[n] = \tan^{-1}\left(\frac{S_{lon} - C_{lon}}{S_{lat} - C_{lat}}\right) \quad (10)$$

calculating the tangent direction ψst at the intersection In of the straight line Lcs and the route R12 using the calculated direction ψcs according to the following formula (11)

$$\phi_{st}[n] = \phi_{cs}[n] + \frac{\pi}{2}, \text{ and} \quad (11)$$

calculating the course setting ψ0[n] using the calculated direction ψcs according to the following formulas (13) and (14)

$$\phi_o[n] = \phi_{st}[n] \pm (\alpha \times REs[n] - \beta \times \Delta REs), \text{ and} \qquad (13)$$

$$\Delta REs = \Delta REs[n] - \Delta REs[n-1] \qquad (14)$$

such that in formula (13), REs[n] is a distance between the intermediate waypoint and the intersection In, which represents a distance between the intermediate waypoint S and the route, and in formula (14), REs[n−1] is a distance between the intermediate waypoint S and the route which are calculated previously, and when the current position of the ship is deviated from the route in the clockwise direction, the minus coefficient is adopted as α, and when the current position of the ship is deviated from the route in the counterclockwise direction, a plus coefficient adopted as α.

14. An automatic steering method using an automatic steering device comprising:

calculating a route to turn a ship based on positions of a plurality of waypoints;

calculating a first command steering angle in accordance with a first calculation before the ship passes a boundary point on the route, and control a rudder of the ship based on the first command steering angle; and upon the ship passing the boundary point:

calculating and repeatedly updating an intermediate waypoint ahead of the ship while the ship is turning around an identified waypoint from among the plurality of waypoints;

calculating a second command steering angle in accordance with a second calculation based on a positional relation between the route and the intermediate waypoint; and controlling the rudder of the ship based on the second command steering angle, wherein the calculating and repeatedly updating the intermediate waypoint is based on a formula which calculates the intermediate waypoint so that a length between a current position of the ship and the intermediate waypoint becomes shorter in proportion to a degree of a response of the ship to the second command steering angle, wherein the first calculation includes calculating a direction ψcs of a straight line Lcs passing through a center C and the intermediate waypoint S using the latitude S_lat and the longitude S_lon of the intermediate waypoint S, and the latitude C_lat and the longitude C_lon of the center C according to the following formula (10)

$$\phi_{cs}[n] = \tan^{-1}\left(\frac{S_{lon} - C_{lon}}{S_{lat} - C_{lat}}\right) \qquad (10)$$

calculating a tangent direction ψst at an intersection In of the straight line Lcs and the route R12 using the calculated direction ψcs according to the following formula (11)

$$\phi_{st}[n] = \phi_{cs}[n] + \frac{\pi}{2}, \text{ and} \qquad (11)$$

calculating a course setting ψ0[n] using the calculated direction ψcs according to the following formula (12)

$$\phi_o[n] = \phi_{st}[n] \pm \alpha \times XTE, \qquad (12)$$

such that when the current position of the ship is deviated from the route in a clockwise direction, a minus coefficient is adopted as α, and when the current position of the ship is deviated from the route in a counterclockwise direction, a plus coefficient is adopted as α, and XTE represents a deviation error of the route and the current position of the ship.

15. The automatic steering method of claim 14, wherein the second calculation includes calculating the direction ψcs of a straight line Lcs passing through the center C and the intermediate waypoint S using the latitude S_lat and the longitude S_lon of the intermediate waypoint S, and the latitude C_lat and the longitude C_lon of the center C according to the following formula (10)

$$\phi_{cs}[n] = \tan^{-1}\left(\frac{S_{lon} - C_{lon}}{S_{lat} - C_{lat}}\right) \qquad (10)$$

calculating the tangent direction ψst at the intersection In of the straight line Lcs and the route R12 using the calculated direction ψcs according to the following formula (11)

$$\phi_{st}[n] = \phi_{cs}[n] + \frac{\pi}{2}, \text{ and} \qquad (11)$$

calculating the course setting ψ0[n] using the calculated direction ψcs according to the following formulas (13) and (14)

$$\phi_o[n] = \phi_{st}[n] \pm (\alpha \times REs[n] - \beta \times \Delta REs), \text{ and} \qquad (13)$$

$$\Delta REs = \Delta REs[n] - \Delta REs[n-1] \qquad (14)$$

such that in formula (13), REs[n] is a distance between the intermediate waypoint and the intersection In, which represents a distance between the intermediate waypoint S and the route, and in formula (14), REs[n−1] is a distance between the intermediate waypoint S and the route which are calculated previously, and when the current position of the ship is deviated from the route in the clockwise direction, the minus coefficient is adopted as α, and when the current position of the ship is deviated from the route in the counterclockwise direction, a plus coefficient adopted as α.

16. A non-transitory computer-readable medium having stored thereon computer-executable instructions which, when executed by a computer, cause the computer to:

calculate a route to turn a ship based on positions of a plurality of waypoints;

calculate a first command steering angle in accordance with a first calculation before the ship passes a boundary point on the route, and control a rudder of the ship based on the first command steering angle; and upon the ship passing the boundary point:
  calculate and repeatedly update an intermediate waypoint ahead of the ship while the ship is turning around an identified waypoint from among the plurality of waypoints;
  calculate a second command steering angle in accordance with a second calculation based on a positional relation between the route and the intermediate waypoint; and
  control the rudder of the ship based on the second command steering angle,
  the calculating and repeatedly updating the intermediate waypoint being based on a formula which calculates the intermediate waypoint so that a length between a current position of the ship and the intermediate waypoint becomes shorter in proportion to a degree of a response of the ship to the second command steering angle,
wherein
the first calculation includes
calculating a direction ψcs of a straight line Lcs passing through a center C and the intermediate waypoint S using the latitude S_lat and the longitude S_lon of the intermediate waypoint S, and the latitude C_lat and the longitude C_lon of the center C according to the following formula (10)

$$\phi_{cs}[n] = \tan^{-1}\left(\frac{S_{lon} - C_{lon}}{S_{lat} - C_{lat}}\right) \quad (10)$$

calculating a tangent direction ψst at an intersection In of the straight line Lcs and the route R12 using the calculated direction ψcs according to the following formula (11)

$$\phi_{st}[n] = \phi_{cs}[n] + \frac{\pi}{2}, \text{ and} \quad (11)$$

calculating a course setting ψ0[n] using the calculated direction ψcs according to the following formula (12)

$$\phi_o[n] = \phi_{st}[n] \pm \alpha \times XTE, \quad (12)$$

such that when the current position of the ship is deviated from the route in a clockwise direction, a minus coefficient is adopted as α, and when the current position of the ship is deviated from the route in a counterclockwise direction, a plus coefficient is adopted as α, and XTE represents a deviation error of the route and the current position of the ship.

17. The non-transitory computer-readable medium according to claim 16, wherein
the second calculation includes
calculating the direction ψcs of a straight line Lcs passing through the center C and the intermediate waypoint S using the latitude S_lat and the longitude S_lon of the intermediate waypoint S, and the latitude C_lat and the longitude C_lon of the center C according to the following formula (10)

$$\phi_{cs}[n] = \tan^{-1}\left(\frac{S_{lon} - C_{lon}}{S_{lat} - C_{lat}}\right) \quad (10)$$

calculating the tangent direction ψst at the intersection In of the straight line Lcs and the route R12 using the calculated direction ψcs according to the following formula (11)

$$\phi_{st}[n] = \phi_{cs}[n] + \frac{\pi}{2}, \text{ and} \quad (11)$$

calculating the course setting ψ0[n] using the calculated direction ψcs according to the following formulas (13) and (14)

$$\phi_o[n] = \phi_{st}[n] \pm (\alpha \times REs[n] - \beta \times \Delta REs), \text{ and} \quad (13)$$

$$\Delta REs = \Delta REs[n] - \Delta REs[n-1] \quad (14)$$

such that in formula (13), REs[n] is a distance between the intermediate waypoint and the intersection In, which represents a distance between the intermediate waypoint S and the route, and in formula (14), REs[n−1] is a distance between the intermediate waypoint S and the route which are calculated previously, and
when the current position of the ship is deviated from the route in the clockwise direction, the minus coefficient is adopted as α, and when the current position of the ship is deviated from the route in the counterclockwise direction, a plus coefficient adopted as α.

* * * * *